United States Patent
Su et al.

(10) Patent No.: US 11,979,355 B2
(45) Date of Patent: May 7, 2024

(54) METHOD FOR RECEIVING INFORMATION, METHOD FOR SENDING INFORMATION, TERMINAL AND NETWORK DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Runhua Chen, Beijing (CN); Xueyuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 147 days.

(21) Appl. No.: 17/607,800

(22) PCT Filed: Feb. 27, 2020

(86) PCT No.: PCT/CN2020/076926
§ 371 (c)(1),
(2) Date: Oct. 29, 2021

(87) PCT Pub. No.: WO2020/220811
PCT Pub. Date: Nov. 5, 2020

(65) Prior Publication Data
US 2022/0200758 A1 Jun. 23, 2022

(30) Foreign Application Priority Data
Apr. 30, 2019 (CN) .......................... 201910363888.8

(51) Int. Cl.
H04L 5/00 (2006.01)
(52) U.S. Cl.
CPC .......... *H04L 5/0051* (2013.01); *H04L 5/0016* (2013.01)

(58) Field of Classification Search
None
See application file for complete search history.

(56) References Cited

U.S. PATENT DOCUMENTS

2020/0267750 A1* 8/2020 Park ..................... H04J 13/0003
2021/0337584 A1* 10/2021 Zhang ................... H04L 5/0051
(Continued)

FOREIGN PATENT DOCUMENTS

| CN | 109150472 A | 1/2019 |
|---|---|---|
| EP | 3952561 A1 | 2/2022 |
| WO | WO-2021/159261 A1 | 8/2021 |

OTHER PUBLICATIONS

Extended European Search Report dated Jun. 3, 2022 for Application No. EP 20798640.7.
(Continued)

*Primary Examiner* — Steve R Young
(74) *Attorney, Agent, or Firm* — Harness, Dickey & Pierce, P.L.C.

(57) ABSTRACT

A method for receiving information, a method for sending information, a terminal and a network device are provided. The method for receiving information includes: receiving indication information, where the indication information is used for indicating at least one transmission configuration indicator TCI state of a demodulation reference signal DMRS port on one or more resources allocated to the terminal; determining a correspondence between the at least one TCI state on the one or more resources and a code division multiplexing CDM group to which the DMRS port belongs; and receiving information according to the correspondence between the TCI state on the one or more resources and the CDM group to which the DMRS port belongs.

12 Claims, 1 Drawing Sheet

(56) References Cited

U.S. PATENT DOCUMENTS

| 2021/0385803 | A1* | 12/2021 | Shi | H04B 7/02 |
| 2022/0021499 | A1* | 1/2022 | Jiang | H04L 5/0048 |
| 2022/0095304 | A1* | 3/2022 | Muruganathan | H04W 72/23 |
| 2022/0124751 | A1* | 4/2022 | Matsumura | H04B 7/024 |
| 2022/0182913 | A1* | 6/2022 | Liu | H04B 7/18541 |

OTHER PUBLICATIONS

CATT, "Consideration on multi-TRP/panel transmission", Agenda item 7.2.8.2, 3GPP TSG RAN WG1 Meeting #96bis, R1-1904561, Apr. 8-12, 2019, Xi'an, China.
CATT, "On multi-TRP/panel transmission", Agenda item 7.2.8.2, 3GPP TSG RAN WG1 Meeting #97, R1-1906345, May 13-17, 2019, Reno, USA.
Huawei, Hisilicon, "Summary of AI: 7.2.8.2 Enhancements on Multi-TRP/Panel Transmission of Offline Discussion", Agenda item 7.2.8.2, 3GPP TSG RAN WG1 Meeting #96, R1-190abcd, Feb. 25-Mar. 1, 2019, Athens, Greece.
Written Opinion and International Search Report for International Application No. PCT/CN2020/076926 dated May 20, 2020.
LG Electronics, "Discussion on DMRS port indication for NCJT", Agenda Item 7.2.8.6, 3GPP TSG RAN WG1 #96bis, R1-1904214, Apr. 8-12, 2019, Xi'an, China.
OPPO, "Enhancements on multi-TRP and multi-panel transmission", Agenda Item 7.2.8.2, 3GPP TSG RAN WG1 Meeting #96bis, R1-1904036, Apr. 8-12, 2019, Xi'an, China.

* cited by examiner

METHOD FOR RECEIVING INFORMATION, METHOD FOR SENDING INFORMATION, TERMINAL AND NETWORK DEVICE

CROSS-REFERENCE TO RELATED APPLICATION

This application is the U.S. national phase of PCT Application No. PCT/CN2020/076926 filed on Feb. 27, 2020, which claims a priority to Chinese Patent Application No. 201910363888.8 filed in China on Apr. 30, 2019, which are incorporated in their entirety by reference herein.

TECHNICAL FIELD

The present disclosure relates to the field of communication technology, and in particular to a method for receiving information, a method for sending information, a terminal, and a network device.

BACKGROUND

In order to improve coverage at an edge of a cell to provide a more balanced quality of service in a service area, coordinated multiple point technology is still an important technical means in the NR system. From the perspective of network morphology, network deployment with a large quantity of distributed access points plus centralized baseband processing may be more conducive to providing a balanced user experience rate, and may significantly reduce latency and signaling overhead caused by handover. As frequency bands become higher, relatively dense deployment of access points is also required from the perspective of ensuring network coverage. In a high frequency band, as the integration level of an active antenna equipment increases, it is more inclined to adopt a modularized active antenna array. An antenna array of each TRP (Transmission and Reception Point) may be divided into several relatively independent antenna panels, so that the shape and the quantity of ports of the entire array may be flexibly adjusted according to deployment scenarios and service requirements. The antenna panels or the TRPs may be connected by optical fibers for more flexible distributed deployment. In a millimeter wave band, as the wavelength decreases, the blocking effect produced by obstacles such as a human body or a vehicle becomes more significant. In this case, from the perspective of ensuring robustness of link connection, cooperation among multiple TRPs or panels may be used to transmit/receive with multiple beams from multiple angles, thereby reducing negative effects caused by the blocking effect.

According to a mapping relationship of transmitted signal streams to multiple TRPs/panels, coordinated multiple point transmission technology may be divided into two types: coherent transmission and non-coherent transmission. In coherent transmission, each data layer is mapped onto multiple TRPs/panels through a weighted vector. In non-coherent transmission, each data stream is only mapped to part of the TRPs/panels. Coherent transmission has higher requirements for synchronization among transmission points and transmission capacity of the backhaul link, so it is relatively sensitive to many non-ideal factors in actual deployment conditions. Comparatively speaking, incoherent transmission is less affected by the above factors, so it is a key consideration for multiple point transmission technology.

NC-JT transmission may use a method (single-PDCCH) in which a single PDCCH (physical downlink control channel) schedules a single PDSCH (physical downlink shared channel), or use a method (multi-PDCCH) in which multiple PDCCHs schedule their corresponding PDSCHs.

For the single-PDCCH method, due to closer coordination among transmission points, a more ideal backhaul link is required to exchange CSI and control information. Taking into account differences in channel conditions among the transmission points or the panels, a new codeword mapping method may be required. For example, using 2 codewords for less than 4 layers may be considered, and independent MCSs (modulation and coding scheme) may be used to respectively match the channel conditions of different transmission points/panels. Using a non-peer-to-peer mapping method for two codewords even may be considered. For signals sent by different transmission points/panels, it is also needed to group DM-RS (demodulation reference signal) ports according to QCL (quasi co-location) relationship, indicate different pieces of QCL information, and design corresponding TCI (transmission configuration indicator) structures and control signalings. In order to support the above enhancements, it may be needed to redesign the DM-RS allocation method in DCI (downlink control information). In addition, it is also needed to consider improvement of the CSI reporting method to support switch between single point transmission and coordinated transmission.

For the multi-PDCCH method, since transmissions of two PDSCHs and corresponding PDCCHs are relatively independent, this method is not sensitive to non-ideal factors such as latency of the backhaul link. In addition, since the various PDSCHs may correspond to different transmission points/panels, independent transmissions of multiple PDSCHs may avoid the complexity of codeword mapping, DMRS port grouping, TCI design, and DMRS port indication. It should be noted that although using a completely flexible scheduling method among multiple PDSCHs may be considered, it is needed to consider using quasi-static coordination among transmission points/panels to avoid interference among PDSCHs or DM-RS ports. Or, certain coordination mechanisms and scheduling restrictions may be used to avoid partial overlap among PDSCHs, so as to ensure accuracy of receiver interference estimation and link adaptation performance. In a case of multi-PDSCH transmission, corresponding uplink and downlink control channel design and HARQ (hybrid automatic repeat request) scheme design also need to be studied.

In addition to eMBB services, coordinated multiple point technology is of great significance for improving reliability of URLLC (ultra-reliable low-latency communication) service transmission. For example, in a high frequency band, the blocking effect may cause a temporary interruption of communication. In this case, coordinated transmission of multiple transmission points/panels may be used to reduce the probability of the signal being blocked. In addition, repeated transmission or diversity transmission of multiple transmission points/panels may be used to improve the reliability of transmission.

The problem in the related technologies is that a correspondence between a TCI state of a DMRS port and a CDM group cannot be determined.

SUMMARY

The embodiments of the present disclosure provide a method for receiving information, a method for sending information, a terminal, and a network device. When implementing multiple point transmission, the correspondence between the CDM group and the TCI state can be determined, which improves the reliability of transmission.

In order to address the above technical problem, the embodiments of the present disclosure provide the following technical solutions.

A method for receiving information, applied to a terminal, including: receiving indication information, where the indication information is used for indicating at least one transmission configuration indicator (TCI) state of a demodulation reference signal (DMRS) port on one or more resources allocated to the terminal; determining a correspondence between the at least one TCI state on the one or more resources and a code division multiplexing (CDM) group to which the DMRS port belongs; and receiving information according to the correspondence between the TCI state on the one or more resources and the CDM group to which the DMRS port belongs.

The determining the correspondence between the at least one TCI state on the one or more resources and the CDM group to which the DMRS port belongs includes: determining that one TCI state on the one or more resources corresponds to N CDM groups, or, determining that two TCI states on the one or more resources correspond to N CDM groups, where N is equal to 1, 2, or 3.

In a case that there are two TCI states and one CDM group, the determining the correspondence between the TCI state and the CDM group to which the DMRS port belongs includes: determining the correspondence between the two TCI states and the one CDM group according to the resources allocated to the terminal; or, receiving signaling and determining the correspondence between the two TCI states and the one CDM group according to the signaling; or, on each resource, the CDM group corresponding to one TCI state of the two TCI states; or, determining the correspondence between the two TCI states and the one CDM group according to a DMRS port allocation value indicated in a DMRS table by a network side.

The determining the correspondence between the two TCI states and the one CDM group according to the resources allocated to the terminal includes: in a case that one resource is allocated to the terminal, the correspondence between the two TCI states and the one CDM group is a first correspondence or a second correspondence; where the first correspondence includes: according to a predefined rule, one TCI state is selected from the two TCI states, and the CDM group corresponds to the selected TCI state; where the second correspondence includes: according to a DMRS port allocation value indicated in downlink control information (DCI), the correspondence between the two TCIs states and the one CDM group is determined, one DMRS port allocation value corresponds to one TCI state, and the CDM group corresponds to the selected TCI state;

in a case that at least two resources are allocated to the terminal, then on each resource, the CDM group corresponds to one TCI state of the two TCI states.

The determining the correspondence between the two TCI states and the one CDM group according to the signaling includes: determining, through the signaling, that the correspondence between the two TCI states and the one CDM group is a third correspondence or a fourth correspondence; where the third correspondence includes: according to a predefined rule, one TCI state is selected from the two TCI states, and the CDM group corresponds to the selected TCI state; where the fourth correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, determining, through the signaling, that the correspondence between the two TCI states and the one CDM group is a fifth correspondence, where the fifth correspondence includes: on each resource, the CDM group corresponds to one TCI state of the two TCI states.

The determining the correspondence between the two TCI states and the one CDM group according to the DMRS port allocation value indicated in the DMRS table by the network side includes:

in a case that a DMRS port allocation value that the terminal is configured to use is a first set, determining that the correspondence between the two TCI states and the one CDM group is a sixth correspondence or a seventh correspondence; where the sixth correspondence includes: according to a predefined rule, one TCI state is selected from the two TCI states, and the CDM group corresponds to the selected TCI state; where the seventh correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, in a case that a DMRS port allocation value that the terminal is configured to use is a second set, then on each resource, the CDM group corresponding to one TCI state of the two TCI states.

On each resource, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; or, in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers.

In a case that there are two TCI states and 2 or 3 CDM groups, the determining the correspondence between the at least one TCI state and the CDM group to which the DMRS port belongs includes:

determining the correspondence between the two TCI states and the 2 or 3 CDM groups according to the resources allocated to the terminal; or, receiving signaling and determining the correspondence between the two TCI states and the 2 or 3 CDM groups according to the signaling; or, determining the correspondence between the two TCI states and the 2 or 3 CDM groups according to a DMRS port allocation value indicated in a DMRS table by a network side.

The determining the correspondence between the two TCI states and the 2 or 3 CDM groups according to the resources allocated to the terminal includes:

in a case that one resource is allocated to the terminal, the correspondence between the two TCI states and the 2 or 3 CDM groups is an eighth correspondence or a ninth correspondence; where the eighth correspondence includes: according to a predefined rule, one TCI state is selected from the two TCI states, and the 2 or 3 CDM groups correspond to the selected TCI state; where the ninth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state;

in a case that at least two resources are allocated to the terminal, then on each resource, the 2 or 3 CDM groups correspond to one TCI state of the two TCI states.

The determining the correspondence between the two TCI states and the 2 or 3 CDM groups according to the signaling includes:

determining, through signaling, that the correspondence between the two TCI states and the 2 or 3 CDM groups is a tenth correspondence or an eleventh correspondence; where the tenth correspondence includes: according to a predefined rule, one TCI state is selected from the two TCI states, and the 2 or 3 CDM groups correspond to the selected TCI state; where the eleventh correspondence includes: according to a DMRS port allocation value indicated in downlink control information (DCI), the correspondence between two TCI states and the 2 or 3 CDM groups is determined, one DMRS port allocation value corresponds to one TCI state, and the 2 or 3 CDM groups correspond to the selected TCI state; or, determining, through signaling, that the correspondence between two TCI states and the 2 or 3 CDM groups is a twelfth correspondence, where the twelfth correspondence includes: on each resource, at least one CDM group of the 2 or 3 CDM groups corresponds to one TCI state of the two TCI states; or, determining, through signaling, that the correspondence between the two TCI states and the 2 or 3 CDM groups is a thirteenth correspondence or a fourteenth correspondence; where the thirteenth correspondence includes: according to a predefined rule, one TCI state of the two TCI states is selected, at least one CDM group of the 2 or 3 CDM groups corresponds to the selected TCI state, and the remaining CDM groups correspond to the other TCI state; where the fourteenth correspondence includes: according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The determining the correspondence between the two TCI states and the 2 or 3 CDM groups according to the DMRS port allocation value indicated in the DMRS table by the network side includes:

in a case that a DMRS port allocation value that the terminal is configured to use is a third set, determining that the correspondence between the two TCI states and the 2 or 3 CDM groups is an eleventh correspondence or a twelfth correspondence; where the eleventh correspondence includes: according to a predefined rule, one TCI state is selected from the two TCI states, and the 2 or 3 CDM groups correspond to the selected TCI state; where the twelfth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state; or, in a case that a DMRS port allocation value that the terminal is configured to use is a fourth set, then on each resource, the 2 or 3 CDM groups correspond to one TCI state of the two TCI states; or, in a case that a DMRS port allocation value that the terminal is configured to use is a fifth set, at least one CDM group of the 2 or 3 CDM groups corresponds to one TCI state of the two TCI states.

On each resource, the 2 or 3 CDM groups corresponding to one TCI state of the two TCI states includes:

in a case that at least two time domain resources are allocated to the terminal, the correspondence between the 2 or 3 CDM groups and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the 2 or 3 CDM groups and the TCI states is associated with serial numbers of the frequency domain resources, one TCI state of the two TCI states is used for frequency domain resources with one type of serial number, and different TCI states are used for frequency domain resources with different types of serial numbers; or, in a case that at least two frequency domain and time domain resources are allocated to the terminal, the correspondence between the 2 or 3 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers.

The at least one CDM group of the 2 or 3 CDM groups corresponding to one TCI state of the two TCI states includes: according to a predefined rule, one TCI state is selected from the two TCI states, the at least one CDM group of the 2 or 3 CDM groups corresponds to the selected TCI state, and the remaining CDM groups correspond to the other TCI state; or, according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The embodiments of the present disclosure also provide a method for sending information, which is applied to a network device, and the method includes: sending indication information, where the indication information is used for indicating at least one transmission configuration indicator (TCI) state of a demodulation reference signal (DMRS) port on one or more resources allocated to a terminal; and sending information to the terminal, where the terminal receives the information according to a determined correspondence between the at least one TCI state on the one or more resources and a code division multiplexing (CDM) group to which the DMRS port belongs.

The correspondence between the at least one TCI state on the one or more resources and the CDM group to which the DMRS port belongs comprises: one TCI state on the one or more resources corresponds to N CDM groups, or, two TCI states on the one or more resources correspond to N CDM groups, where N is equal to 1, 2, or 3.

In a case that two TCI states on the one or more resources correspond to one CDM group, the correspondence between the TCI state and the CDM group to which the DMRS port belongs comprises: on each resource of the one or more resources, the CDM group corresponding to one TCI state of the two TCI states.

The CDM group corresponding to one TCI state of the two TCI states comprises: in a case that at least two resources are allocated to the terminal, then on each resource of the at least two resources, the CDM group corresponds to one TCI state of the two TCI states.

On each resource of the one or more resources, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers.

The method for sending information further includes: in a case that two TCI states on the one or more resources correspond to 2 or 3 CDM groups, sending signaling to the terminal, where the signaling is used for indicating the correspondence between the two TCI states on the one or more resources and the 2 or 3 CDM groups.

The embodiments of the present disclosure also provide a terminal, including: a processor, a transceiver and a memory, where the memory stores a program executable by the processor, and the processor, when executing the program, performs the following steps: receiving indication information, where the indication information is used for indicating at least one transmission configuration indicator (TCI) state of a demodulation reference signal (DMRS) port on one or more resources allocated to the terminal; determining a correspondence between the at least one TCI state on the one or more resources and a code division multiplexing (CDM) group to which the DMRS port belongs; and receiving information according to the correspondence between the TCI state on the one or more resources and the CDM group to which the DMRS port belongs.

The determining the correspondence between the at least one TCI state on the one or more resources and the CDM group to which the DMRS port belongs includes: determining that one TCI state on the one or more resources corresponds to N CDM groups, or, determining that two TCI states on the one or more resources correspond to N CDM groups, where N is equal to 1, 2, or 3.

In a case that there are two TCI states and one CDM group, the determining the correspondence between the TCI state and the CDM group to which the DMRS port belongs includes: determining the correspondence between the two TCI states and the one CDM group according to the resources allocated to the terminal; or, receiving signaling and determining the correspondence between the two TCI states and the one CDM group according to the signaling; or, on each resource, the CDM group corresponding to one TCI state of the two TCI states; or, determining the correspondence between the two TCI states and the one CDM group according to a DMRS port allocation value indicated in a DMRS table by a network side.

The determining the correspondence between the two TCI states and the one CDM group according to the resources allocated to the terminal includes:

in a case that one resource is allocated to the terminal, the correspondence between the two TCI states and the one CDM group is a first correspondence or a second correspondence; where the first correspondence includes: according to a predefined rule, one TCI state is selected from the two TCI states, and the CDM group corresponds to the selected TCI state; where the second correspondence includes: according to a DMRS port allocation value indicated in downlink control information (DCI), the correspondence between the two TCIs states and the one CDM group is determined, one DMRS port allocation value corresponds to one TCI state, and the CDM group corresponds to the selected TCI state;

in a case that at least two resources are allocated to the terminal, then on each resource, the CDM group corresponds to one TCI state of the two TCI states.

The determining the correspondence between the two TCI states and the one CDM group according to the signaling includes:

determining, through the signaling, that the correspondence between the two TCI states and the one CDM group is a third correspondence or a fourth correspondence; where the third correspondence includes: according to a predefined rule, one TCI state is selected from the two TCI states, and the CDM group corresponds to the selected TCI state; where the fourth correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, determining, through the signaling, that the correspondence between the two TCI states and the one CDM group is a fifth correspondence, where the fifth correspondence includes: on each resource, the CDM group corresponds to one TCI state of the two TCI states.

The determining the correspondence between the two TCI states and the one CDM group according to the DMRS port allocation value indicated in the DMRS table by the network side includes:

in a case that a DMRS port allocation value that the terminal is configured to use is a first set, determining that the correspondence between the two TCI states and the one CDM group is a sixth correspondence or a seventh correspondence; where the sixth correspondence includes: according to a predefined rule, one TCI state is selected from the two TCI states, and the CDM group corresponds to the selected TCI state; where the seventh correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, in a case that a DMRS port allocation value that the terminal is configured to use is a second set, then on each resource, the CDM group corresponding to one TCI state of the two TCI states.

On each resource, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; or, in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial numbers, and different TCI states are used for frequency domain or time domain resources with different types of serial numbers.

In a case that there are two TCI states and 2 or 3 CDM groups, the determining the correspondence between the at least one TCI state and the CDM group to which the DMRS port belongs includes: determining the correspondence between the two TCI states and the 2 or 3 CDM groups according to the resources allocated to the terminal; or, receiving signaling and determining the correspondence between the two TCI states and the 2 or 3 CDM groups according to the signaling; or, determining the correspondence between the two TCI states and the 2 or 3 CDM groups according to a DMRS port allocation value indicated in a DMRS table by a network side.

The determining the correspondence between the two TCI states and the 2 or 3 CDM groups according to the resources allocated to the terminal includes:

in a case that one resource is allocated to the terminal, the correspondence between the two TCI states and the 2 or 3 CDM groups is an eighth correspondence or a ninth correspondence; where the eighth correspondence includes: according to a predefined rule, one TCI state is selected from the two TCI states, and the 2 or 3 CDM groups correspond to the selected TCI state; where the ninth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state;

in a case that at least two resources are allocated to the terminal, then on each resource, the 2 or 3 CDM groups correspond to one TCI state of the two TCI states.

The determining the correspondence between the two TCI states and the 2 or 3 CDM groups according to the signaling includes:

determining, through signaling, that the correspondence between the two TCI states and the 2 or 3 CDM groups is a tenth correspondence or an eleventh correspondence; where the tenth correspondence includes: according to a predefined rule, one TCI state is selected from the two TCI states, and the 2 or 3 CDM groups correspond to the selected TCI state; where the eleventh correspondence includes: according to a DMRS port allocation value indicated in downlink control information (DCI), the correspondence between two TCI states and the 2 or 3 CDM groups is determined, one DMRS port allocation value corresponds to one TCI state, and the 2 or 3 CDM groups correspond to the selected TCI state; or, determining, through signaling, that the correspondence between two TCI states and the 2 or 3 CDM groups is a twelfth correspondence, where the twelfth correspondence includes: on each resource, at least one CDM group of the 2 or 3 CDM groups corresponds to one TCI state of the two TCI states; or, determining, through signaling, that the correspondence between the two TCI states and the 2 or 3 CDM groups is a thirteenth correspondence or a fourteenth correspondence; where the thirteenth correspondence includes: according to a predefined rule, one TCI state of the two TCI states is selected, at least one CDM group of the 2 or 3 CDM groups corresponds to the selected TCI state, and the remaining CDM groups correspond to the other TCI state; where the fourteenth correspondence includes: according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The determining the correspondence between the two TCI states and the 2 or 3 CDM groups according to the DMRS port allocation value indicated in the DMRS table by the network side includes:

in a case that a DMRS port allocation value that the terminal is configured to use is a third set, determining that the correspondence between the two TCI states and the 2 or 3 CDM groups is an eleventh correspondence or a twelfth correspondence; where the eleventh correspondence includes: according to a predefined rule, one TCI state is selected from the two TCI states, and the 2 or 3 CDM groups correspond to the selected TCI state; where the twelfth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state; or, in a case that a DMRS port allocation value that the terminal is configured to use is a fourth set, then on each resource, the 2 or 3 CDM groups correspond to one TCI state of the two TCI states; or, in a case that a DMRS port allocation value that the terminal is configured to use is a fifth set, at least one CDM group of the 2 or 3 CDM groups corresponds to one TCI state of the two TCI states.

On each resource, the 2 or 3 CDM groups corresponding to one TCI state of the two TCI states includes:

in a case that at least two time domain resources are allocated to the terminal, the correspondence between the 2 or 3 CDM groups and the TCI states is associated with serial numbers of mini slots or slots, one TCI state of the two TCI states is used mini slots or slots with one type of serial number, and different TCI states are used for mini slots or slots with different types of serial numbers; or, in a case that at least two frequency domain resources are allocated to the terminal, the correspondence between the 2 or 3 CDM groups and the TCI states is associated with serial numbers of the frequency domain resources, one TCI state of the two TCI states is used frequency domain resources with one type of serial number, and different TCI states are used for frequency domain resources with different types of serial numbers; or, in a case that at least two frequency domain and time domain resources are allocated to the terminal, the correspondence between the 2 or 3 CDM groups and the TCI states is associated with serial numbers of the frequency domain or time domain resources, one TCI state of the two TCI states is used frequency domain or time domain resources with one type of serial number, and different TCI states are used for frequency domain or time domain resources with different types of serial numbers.

The at least one CDM group of the 2 or 3 CDM groups corresponding to one TCI state of the two TCI states includes: according to a predefined rule, one TCI state is selected from the two TCI states, the at least one CDM group of the 2 or 3 CDM groups corresponds to the selected TCI state, and the remaining CDM groups correspond to the other TCI state; or, according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The embodiments of the present disclosure also provide a device for receiving information, including:

a receiving and sending module, configured to receive indication information, where the indication information is used for indicating at least one transmission configuration indicator (TCI) state of a demodulation reference signal (DMRS) port on one or more resources allocated to the terminal; and a processing module, configured to determine a correspondence between the at least one TCI state on the one or more resources and a code division multiplexing (CDM) group to which the DMRS port belongs; and where the receiving and sending module is further configured to receive information according to the correspondence between the TCI state on the one or more resources and the CDM group to which the DMRS port belongs.

The embodiments of the present disclosure also provide a network device, including a processor, a transceiver and a memory, where the memory stores a program executable by the processor, and the processor, when executing the program, performs the following steps: sending indication information, where the indication information is used for indicating at least one transmission configuration indicator (TCI) state of a demodulation reference signal (DMRS) port on one or more resources allocated to a terminal; and sending information to the terminal, where the terminal receives the information according to a determined correspondence between the at least one TCI state on the one or more resources and a code division multiplexing (CDM) group to which the DMRS port belongs.

The embodiments of the present disclosure also provide a device for sending information, including: a receiving and sending module, configured to send indication information, where the indication information is used for indicating at least one transmission configuration indicator (TCI) state of a demodulation reference signal (DMRS) port on one or more resources allocated to a terminal; where the receiving and sending module is further configured to send information to the terminal, where the terminal receives the information according to a determined correspondence between the at least one TCI state on the one or more resources and a code division multiplexing (CDM) group to which the DMRS port belongs.

The embodiments of the present disclosure further provide a computer storage medium having instructions, where the instructions, when being executed by a computer, configure the computer to perform the method as described above.

The beneficial effects of the embodiments of the present disclosure are as follows.

In the above embodiments of the present disclosure, the terminal receives the indication information, where the indication information is used for indicating the at least one transmission configuration indicator TCI state of the demodulation reference signal DMRS port on the one or more resources allocated to the terminal; determines the correspondence between the at least one TCI state on one or more resources and the code division multiplexing CDM group to which the DMRS port belongs; and receives the information according to the correspondence between the TCI state on the one or more resources and the CDM group to which the DMRS port belongs. In this way, the correspondence between the CDM group and the TCI state can be determined in a case of multiple point transmission, which improves the reliability of transmission.

DETAILED DESCRIPTION

Exemplary embodiments of the present disclosure are described in more detail with reference to the accompanying drawings hereinafter. Although the drawings show exemplary embodiments of the present disclosure, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

To address the problem in the related technologies that the correspondence between the CDM group and the TCI state cannot be determined, the embodiments of the present disclosure provide a method for receiving information, a method for sending information, a terminal, and a network device. In this way, in a case of multiple point transmission, information can be received according to the correspondence between the CDM group and TCI state, which improves the reliability of transmission. In the following embodiments of the present disclosure, the meaning of "a resource" includes:

for TDM (time division multiplexing), a resource corresponds to a slot/mini slot;

for FDM (frequency division multiplexing), a resource corresponds to a set of frequency resources (a set formed by a group of resource blocks RB);

for TDM+FDM (time division multiplexing and frequency division multiplexing), a resource corresponds to a slot/mini slot and a set of frequency resources (a set formed by a group of RBs).

Figure 1:
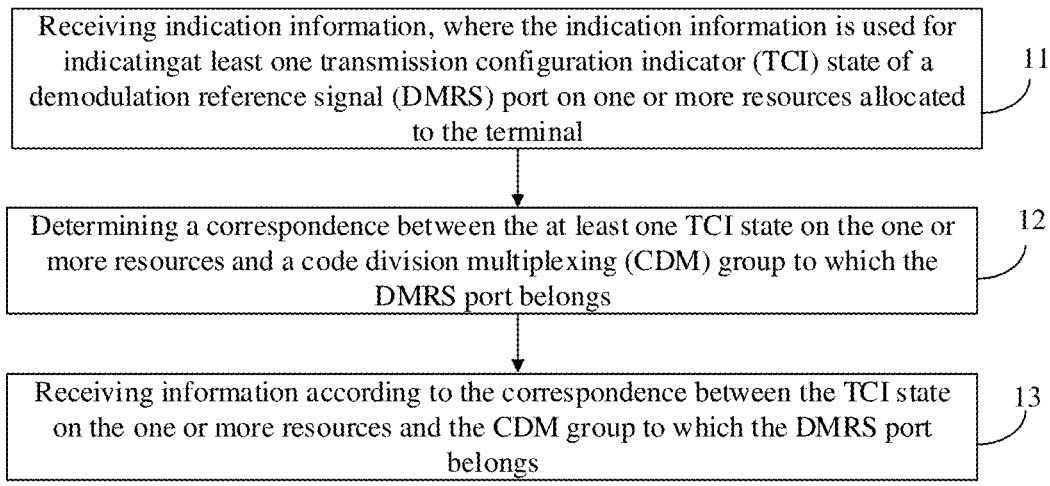
FIG. 1 is a flow chart of a method for receiving information according to the present disclosure.

As shown in FIG. 1, embodiments of the present disclosure provide a method for receiving information, which is applied to a terminal, and the method includes the following steps.

Step 11: receiving indication information, where the indication information is used for indicating at least one transmission configuration indicator (TCI) state of a demodulation reference signal (DMRS) port on one or more resources allocated to the terminal.

Step 12: determining a correspondence between the at least one TCI state on the one or more resources and a code division multiplexing (CDM) group to which the DMRS port belongs.

Step 13: receiving information according to the correspondence between the TCI state on the one or more resources and the CDM group to which the DMRS port belongs.

In the embodiments, in step 12, the TCI state may include: one or two TCI states; the CDM group may include: 1, 2, or 3 CDM groups.

Specifically, step 12 may include:

determining that one TCI state on the one or more resources corresponds to N CDM groups, or, determining that two TCI states on the one or more resources correspond to N CDM groups, where N is equal to 1, 2, or 3.

Examples are as follows.

The first case: when DMRS(s) allocated to the UE belongs to one CDM group and one TCI state is indicated to the UE, the CDM group corresponds to the indicated TCI state.

The second case: when DMRS(s) allocated to the UE belongs to two CDM groups, and one TCI state is indicated to the UE, the CDM groups correspond to the indicated TCI state.

The third case: when DMRS(s) allocated to the UE belongs to 3 CDM groups, and one TCI state is indicated to the UE, the CDM groups correspond to the indicated TCI state.

The fourth case: when DMRS(s) allocated to the UE belongs to one CDM group and two TCI states are indicated to the UE, the correspondence between the CDM group and the TCI states is determined by the following optional methods:

4.1) determining the correspondence between the two TCI states and the one CDM group according to the resources allocated to the terminal; or, 4.2) receiving signaling and determining the correspondence between the two TCI states and the one CDM group according to the signaling; or, 4.3) on each resource, the CDM group corresponding to one TCI state of the two TCI states; or, 4.4) determining the correspondence between the two TCI states and the one CDM group according to a DMRS port allocation value indicated in a DMRS table by a network side.

The fifth case: When DMRS(s) allocated to the UE belongs to 2 CDM groups, and 2 TCI states are indicated to the UE, the correspondence between the CDM groups and the TCI states is determined by the following optional methods:

5.1) determining the correspondence between the two TCI states and the 2 CDM groups according to the resources allocated to the terminal; or, 5.2) receiving signaling and determining the correspondence between the two TCI states and the 2 CDM groups according to the signaling; or, 5.3) determining the correspondence between the two TCI states and the 2 CDM groups according to a DMRS port allocation value indicated in a DMRS table by a network side.

The sixth case: when DMRS(s) allocated to the UE belongs to 3 CDM groups, and 2 TCI states are indicated to the UE, the correspondence between the CDM groups and the TCI states is determined by the following optional methods:

6.1) determining the correspondence between the two TCI states and the 3 CDM groups according to the resources allocated to the terminal; or, 6.2) receiving signaling and determining the correspondence between the two TCI states and the 3 CDM groups according to the signaling; or, 6.3) determining the correspondence between the two TCI states and the 3 CDM groups according to a DMRS port allocation value indicated in a DMRS table by a network side.

The above 4.1) may include the follows.

4.11) In a case that one resource is allocated to the terminal by the network side through control information, the correspondence between the two TCI states and the one CDM group is a first correspondence; where the first correspondence includes: according to a predefined rule, one TCI state is selected from the two TCI states, and the CDM group corresponds to the selected TCI state; for example, according to the predefined rule, one of the TCI states is selected, and the CDM group correspond to the selected TCI state. For example, the first TCI state is always selected; or, the correspondence between the two TCI states and the one CDM group is a second correspondence; where the second correspondence includes: according to a DMRS port allocation value indicated in downlink control information (DCI), the correspondence between the two TCIs states and the one CDM group is determined, one DMRS port allocation value corresponds to one TCI state, and the CDM group corresponds to the selected TCI state; for example, a DMRS port allocation value (value as shown in Table 1 to Table 4) indicated in the DCI corresponds to a mapping relationship. For example, value m corresponds to the selection of the first TCI state, and value n corresponds to the selection of the second TCI state . . . The specific value as used is not limited to the cases in Tables 1 to 4.

TABLE 1

Antenna port(s) (1000 + DMRS port), dmrs-Type = 1, maxLength = 1
One Codeword: Codeword 0 enabled, Codeword 1 disabled

| Value | Number of DMRS CDM group(s) without data | DMRS port(s) |
| --- | --- | --- |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 2

Antenna port(s) (1000 + DMRS port), dmrs-Type = 1, maxLength = 2

| | One Codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 3

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 4

| Antenna port(s) (1000 + DMRS port), dmrs-Type = 2, maxLength = 2 |||||||
|---|---|---|---|---|---|---|
| One codeword: Codeword 0 enabled, Codeword 1 disabled |||| Two Codewords: Codeword 0 enabled, Codeword 1 enabled |||
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected.

4.12) In a case that at least two resources are allocated to the terminal, then on each resource, the CDM group corresponds to one TCI state of the two TCI states. That is, if the network side instructs, through the control information, the terminal to use more than one resource, then on each resource, the CDM group corresponds to one of the TCI states.

Specifically, 4.121) in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources (corresponding to the TDM mode), and the correspondence between the CDM group and the TCI states is associated with serial numbers of mini slots or slots. For example, odd-numbered mini slots or slots use the first TCI state, and even-numbered mini slots or slots use the second TCI state. Or, 4.122) in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources (corresponding to the FDM mode), and the correspondence between the CDM group and the TCI states is associated with serial numbers of the frequency domain resources. For example, odd-numbered frequency domain resources use the first TCI state, and even-numbered frequency domain resources use the second TCI state. Or, 4.123) in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers. For example, the network side indicates multiple frequency domain and time domain resources (corresponding to the FDM+TDM mode), and the correspondence between the CDM group and the TCI states is associated with serial numbers of the frequency domain or time domain resources. For example, odd-numbered frequency domain or time domain resources use the first TCI state, and even-numbered frequency domain or time domain resources use the second TCI state.

The above 4.2) may include the follows:

4.21) determining, through the signaling, that the correspondence between the two TCI states and the one CDM group is a third correspondence; where the third correspondence includes: according to a predefined rule, one TCI state is selected from the two TCI states, and the CDM group corresponds to the selected TCI state; for example, if the network side instructs, through control information, the terminal to use a corresponding mode A, the correspondence between the CDM group and the TCI states may be determined in the following manner: according to the predefined rule, one of the TCI states is selected for use, and the CDM group corresponds to the selected TCI state. For example, the first TCI state is always selected;

or, 4.22) determining, through the signaling, that the correspondence between the two TCI states and the one CDM group is a fourth correspondence; where the fourth correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; for example, a DMRS port allocation value (value as shown in Table 1 to Table 4 or value in a newly defined DMRS table) indicated in the DCI corresponds to a mapping relationship. For example, value m corresponds to the selection of the first TCI state, and value n corresponds to the selection of the second TCI state . . . The specific value as used is not limited to the cases in Tables 1 to 4. For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected; or, 4.23) determining, through the signaling, that the correspondence between the two TCI states and the one CDM group is a fifth correspondence, where the fifth correspondence includes: on each resource, the CDM group corresponds to one TCI state of the two TCI states. That is, if the network side instructs, through control information, the terminal to use a corresponding mode B, then on each resource, the CDM group corresponds to one of the TCI states.

Specifically, 4.231) in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources or the network side indicates that the corresponding mode is TDM mode, and the correspondence between the CDM group and the TCI states is associated with serial numbers of mini slots or slots. For example, odd-numbered mini slots or slots use the first TCI state, and even-numbered mini slots or slots use the second TCI state; or, 4.232) in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources or the network side indicates that the corresponding mode is FDM mode, and the correspondence between the CDM group and the TCI states is associated with serial numbers of the frequency domain resources. For example, odd-numbered frequency domain resources use the first TCI state, and even-numbered frequency domain resources use the second TCI state; or, 4.233) in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers; for example, the network side indicates multiple frequency domain and time domain resources or the network side indicates that the corresponding mode is FDM+TDM mode, and the correspondence between the CDM group and the TCI states is associated with serial numbers of the frequency domain or time domain resources. For example, odd-numbered frequency domain or time domain resources use the first TCI state, and even-numbered frequency domain or time domain resources use the second TCI state.

In the above 4.3), if the network side instructs, through control information, the terminal to use the corresponding mode B, then on each resource, the CDM group corresponds to one of the TCI states; specifically, it may include:

4.31) in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources or the network side indicates that the corresponding mode is B-1 (corresponding to the TDM mode), and the correspondence between the CDM group and the TCI states is associated with serial numbers of mini slots or slots. For example, odd-numbered mini slots or slots use the first TCI state, and even-numbered mini slots or slots use the second TCI state; or, 4.32) in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources or the network side indicates that the corresponding mode is FDM mode, and the correspondence between the CDM group and the TCI states is associated with serial numbers of the frequency domain resources. For example, odd-numbered frequency domain resources use the first TCI state, and even-numbered frequency domain resources use the second TCI state; or, 4.33) in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers; for example, the network side indicates multiple frequency domain and time domain resources or the network side indicates that the corresponding mode is FDM+TDM mode, and the correspondence between the CDM group and the TCI states is associated with serial numbers of the frequency domain or time domain resources. For example, odd-numbered frequency domain or time domain resources use the first TCI state, and even-numbered frequency domain or time domain resources use the second TCI state.

In the above 4.4), determining according to the value indicated in the DMRS table (such as Table 1 to Table 4 or a new table formed after adding a new value) by the network side may include:

4.41) in a case that a DMRS port allocation value that the terminal is configured to use is a first set, determining that the correspondence between the two TCI states and the one CDM group is a sixth correspondence; where the sixth correspondence includes: according to a predefined rule, one TCI state is selected from the two TCI states, and the CDM group corresponds to the selected TCI state; for example, if the network side instructs, through control information, the terminal to use a value set X, the correspondence between the CDM group and the TCI states may be determined in the following manner: according to the predefined rule, one of the TCI states is selected for use, and the CDM group corresponds to the selected TCI state. For example, the first TCI state is always selected. Or, 4.42) in a case that a DMRS port allocation value that the terminal is configured to use is a first set, determining that the correspondence between the two TCI states and the one CDM group is a seventh correspondence; where the seventh correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; if the network side instructs, through control information, the terminal to use a value set X, the correspondence between the CDM group and the TCI states may be determined in the following manner: a DMRS port allocation value (value as shown in Table 1 to Table 4 or value in a newly defined DMRS table) indicated in the DCI corresponds to a mapping relationship. For example, value m (belonging to value set X) corresponds to the selection of the first TCI state, and value n (also belonging to value set X) corresponds to the selection of the second TCI state . . . The specific value as used is not limited to the cases in Tables 1 to 4. For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected; or, 4.43) in a case that a DMRS port allocation value that the terminal is configured to use is a second set, then on each resource, the CDM group corresponding to one TCI state of the two TCI states. That is, if the network side instructs, through control information, the terminal to use a value set Y, then on each resource, the CDM group corresponds to one of the TCI states. It may include:

4.431) in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources or the network side indicates that the corresponding mode is TDM mode, and the correspondence between the CDM group and the TCI states is associated with serial numbers of mini slots or slots. For example, odd-numbered mini slots or slots use the first TCI state, and even-numbered mini slots or slots use the second TCI state. Or, 4.432) in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources or the network side indicates that the corresponding mode is FDM mode, and the correspondence between the CDM group and the TCI states is associated with serial numbers of the frequency domain resources. For example, odd-numbered frequency domain resources use the first TCI state, and even-numbered frequency domain resources use the second TCI state. Or, 4.433) in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers; for example, the network side indicates multiple frequency domain and time domain resources or the network side indicates that the corresponding mode is FDM+TDM mode, and the correspondence between the CDM group and the TCI states is associated with serial numbers of the frequency domain or time domain resources. For example, odd-numbered frequency domain or time domain resources use the first TCI state, and even-numbered frequency domain or time domain resources use the second TCI state.

In the above 5.1), it may specifically include:

5.11) in a case that one resource is allocated to the terminal, the correspondence between the two TCI states and the 2 CDM groups is an eighth correspondence; where the eighth correspondence includes: according to a predefined rule, one TCI state is selected from the two TCI states, and the 2 CDM groups correspond to the selected TCI state; for example, if the network side instructs, through control information, the terminal to use one resource, the correspondence between the two CDM groups and the TCI states may be determined in the following manner: according to the predefined rule, one of the TCI states is selected for use, and the two CDM groups correspond to the selected TCI state. For example, the first TCI state is always selected. Or, 5.12) in a case that one resource is allocated to the terminal, the correspondence between the two TCI states and the 2 CDM groups is a ninth correspondence; where the ninth correspondence includes: according to a DMRS port allocation value indicated in downlink control information (DCI), the correspondence between the two TCI states and the 2 CDM groups is determined, one DMRS port allocation value corresponds to one TCI state, and the 2 CDM groups correspond to the selected TCI state; for example, if the network side instructs, through control Information, the terminal to use one resource, the correspondence between the two CDM groups and the TCI states may be determined in the following manner: a DMRS port allocation value (value as shown in Table 1 to Table 4 or value in a newly defined DMRS table) indicated in the DCI corresponds to a mapping relationship. For example, value m corresponds to the selection of the first TCI state, and value n corresponds to the selection of the second TCI state . . . The specific value as used is not limited to the cases in Tables 1 to 4. For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected. Or, 5.13) in a case that at least two resources are allocated to the terminal, then on each resource, the 2 CDM groups correspond to one TCI state of the two TCI states. That is, if the network side instructs, through control information, the terminal to use more than one resource, then on each resource, the two CDM groups correspond to one of the TCI states. Specifically, it may include:

5.131) in a case that at least two time domain resources are allocated to the terminal, the correspondence between the 2 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources (corresponding to the TDM mode), and the correspondence between the 2 CDM groups and the TCI states is associated with serial numbers of mini slots or slots. For example, odd-numbered mini slots or slots use the first TCI state, and even-numbered mini slots or slots use the second TCI state; or, 5.132) in a case that at least two frequency domain resources are allocated to the terminal, the correspondence between the 2 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources (corresponding to the FDM mode), and the correspondence between the 2 CDM groups and the TCI states is associated with serial numbers of the frequency domain resources. For example, odd-numbered frequency domain resources use the first TCI state, and even-numbered frequency domain resources use the second TCI state; or, 5.133) in a case that at least two frequency domain and time domain resources are allocated to the terminal, the correspondence between the 2 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers. For example, the network side indicates multiple frequency domain and time domain resources (corresponding to the FDM+TDM mode), and the correspondence between the 2 CDM groups and the TCI states is associated with serial numbers of the frequency domain or time domain resources. For example, odd-numbered frequency domain or time domain resources use the first TCI state, and even-numbered frequency domain or time domain resources use the second TCI state.

In the above 5.2), it may specifically include:

5.21) determining, through signaling, that the correspondence between the two TCI states and the 2 CDM groups is a tenth correspondence; where the tenth correspondence includes: according to a predefined rule, one TCI state is selected from the two TCI states, and the 2 CDM groups correspond to the selected TCI state; for example, if the network side instructs, through control information, the terminal to use a corresponding mode C, the correspondence between the CDM groups and the TCI states may be determined in the following manner: according to the predefined rule, one of the TCI states is selected for use, and the 2 CDM groups correspond to the selected TCI state. For example, the first TCI state is always selected. Or, 5.22) determining, through signaling, that the correspondence between the two TCI states and the 2 CDM groups is an eleventh correspondence; where the eleventh correspondence includes: according to a DMRS port allocation value indicated in downlink control information (DCI), the correspondence between two TCI states and the 2 CDM groups is determined, one DMRS port allocation value corresponds to one TCI state; for example, if the network side instructs, through control information, the terminal to use a corresponding mode C, the correspondence between the CDM groups and the TCI states may be determined in the following manner: a DMRS port allocation value (value as shown in Table 1 to Table 4 or value in a newly defined DMRS table) indicated in the DCI corresponds to a mapping relationship. For example, value m corresponds to the selection of the first TCI state, and value n corresponds to the selection of the second TCI state . . . The specific value as used is not limited to the cases in Tables 1 to 4. For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected. Or, 5.23) determining, through signaling, that the correspondence between two TCI states and the 2 CDM groups is a twelfth correspondence, where the twelfth correspondence includes: on each resource, at least one CDM group of the 2 CDM groups corresponds to one TCI state of the two TCI states; that is, if the network side instructs, through control information, the terminal to use a corresponding mode D (or the following D-1, D-2, D-3), then on each resource, the 2 CDM groups corresponds to one of the TCI states; specifically, 5.231) in a case that at least two time domain resources are allocated to the terminal, the correspondence between the 2 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates that the corresponding mode is TDM mode, and the correspondence between the 2 CDM groups and the TCI states is associated with serial numbers of mini slots or slots. For example, odd-numbered mini slots or slots use the first TCI state, and even-numbered mini slots or slots use the second TCI state. Or, 5.232) in a case that at least two frequency domain resources are allocated to the terminal, the correspondence between the 2 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates that the corresponding mode is FDM mode, and the correspondence between the 2 CDM groups and the TCI states is associated with serial numbers of the frequency domain resources. For example, for odd-numbered frequency domain resources, the 2 CDM groups use the first TCI state, and for even-numbered frequency domain resources, the 2 CDM groups use the second TCI state. Or, 5.233) in a case that at least two frequency domain and time domain resources are allocated to the terminal, the correspondence between the 2 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers. For example, the network side indicates that the corresponding mode is FDM+TDM mode, and the correspondence between the 2 CDM groups and the TCI states is associated with serial numbers of the frequency domain or time domain resources. For example, for odd-numbered frequency domain or time domain resources, the 2 CDM groups use the first TCI state, and for even-numbered frequency domain or time domain resources, the 2 CDM groups use the second TCI state. Or, 5.24) determining, through signaling, that the correspondence between the two TCI states and the 2 CDM groups is a thirteenth correspondence; where the thirteenth correspondence includes: according to a predefined rule, one TCI state of the two TCI states is selected, at least one CDM group of the 2 CDM groups corresponds to the selected TCI state, and the remaining CDM groups correspond to the other TCI state; for example, the network side indicates that the corresponding mode is eMBB service or SDM mode, each of the 2 CDM groups corresponds to one TCI state, and the correspondence between the CDM groups and the TCI states may be determined in the following manner: according to the predefined rule, for example, the first TCI state is selected for the first CDM group, and the second TCI state is selected for the second CDM group. Or, 5.25) determining, through signaling, that the correspondence between the two TCI states and the 2 groups is a fourteenth correspondence; where the fourteenth correspondence includes: according to a DMRS port allocation value indicated in downlink control information (DCI), the correspondence between the two TCI states and the 2 CDM groups is determined, one DMRS port allocation value corresponds to two TCI states, and one TCI state corresponds to at least one CDM group. For example, a DMRS port allocation value (value as shown in Table 1 to Table 4) indicated in the DCI corresponds to a mapping relationship. For example, value m1 corresponds to that the first TCI state is selected for the first CDM group, and the second TCI state is selected for the second CDM group; value n1 corresponds to that the second TCI state is selected for the first CDM group, and the first TCI state is selected for the second CDM group . . . The specific value as used is not limited to the cases in Tables 1 to 4.

In the above 5.3), it may specifically include:

5.31) in a case that a DMRS port allocation value that the terminal is configured to use is a third set, determining that the correspondence between the two TCI states and the 2 CDM groups is an eleventh correspondence; where the eleventh correspondence includes: according to a predefined rule, one TCI state is selected from the two TCI states, and the 2 CDM groups correspond to the selected TCI state; for example, if the network side instructs, through control information, the terminal to use a value set X1, the correspondence between the CDM groups and the TCI states may be determined in the following manner: according to the predefined rule, one of the TCI states is selected for use, and the 2 CDM groups correspond to the selected TCI state. For example, the first TCI state is always selected. Or, 5.32) in a case that a DMRS port allocation value that the terminal is configured to use is a third set, determining that the correspondence between the two TCI states and the 2 CDM groups is a twelfth correspondence; where the twelfth correspondence includes: according to a DMRS port allocation value indicated in downlink control information (DCI), the correspondence between the two TCI states and the 2 CDM groups is determined, one DMRS port allocation value corresponds to one TCI state, and the 2 CDM groups correspond to the selected TCI state; for example, a DMRS port allocation value (value as shown in Table 1 to Table 4 or value in a newly defined DMRS table) indicated in the DCI corresponds to a mapping relationship. For example, value m1 (belonging to value set X1) corresponds to the selection of the first TCI state, and value n1 (also belonging to value set X1) corresponds to the selection of the second TCI state . . . The specific value as used is not limited to the cases in Tables 1 to 4. Or, 5.33) in a case that a DMRS port allocation value that the terminal is configured to use is a fourth set, then on each resource, the 2 CDM groups correspond to one TCI state of the two TCI states; that is, if the network side instructs, through control information, the terminal to use a value set Y1, then on each resource, the 2 CDM groups correspond to one of the TCI states. Specifically, it may include:

5.331) in a case that at least two time domain resources are allocated to the terminal, the correspondence between the 2 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources or the network side indicates that the corresponding mode is TDM mode, and the correspondence between the 2 CDM groups and the TCI states is associated with serial numbers of mini slots or slots. For example, the 2 CDM groups on odd-numbered mini slots or slots use the first TCI state, and the 2 CDM groups on even-numbered mini slots or slots use the second TCI state; or, 5.332) in a case that at least two frequency domain resources are allocated to the terminal, the correspondence between the 2 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources or the network side indicates that the corresponding mode is FDM mode, and the correspondence between the 2 CDM groups and the TCI states is associated with serial numbers of the frequency domain resources. For example, the 2 CDM groups on odd-numbered frequency domain resources use the first TCI state, and the 2 CDM groups on even-numbered frequency domain resources use the second TCI state; or, 5.333) in a case that at least two frequency domain and time domain resources are allocated to the terminal, the correspondence between the 2 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers; for example, the network side indicates multiple frequency domain and time domain resources or the network side indicates that the corresponding mode is FDM+TDM mode, and the correspondence between the 2 CDM groups and the TCI states is associated with serial numbers of the frequency domain or time domain resources. For example, the 2 CDM groups on odd-numbered frequency domain or time domain resources use the first TCI state, and the 2 CDM groups on even-numbered frequency domain or time domain resources use the second TCI state; for example, the network side indicates multiple frequency domain and time domain resources or the network side indicates that the corresponding mode is B-3 (corresponding to FDM+TDM mode), and the correspondence between the 2 CDM groups and the TCI states is associated with serial numbers of the frequency domain or time domain resources. For example, the 2 CDM groups on odd-numbered frequency domain or time domain resources use the first TCI state, and the 2 CDM groups on even-numbered frequency domain or time domain resources use the second TCI state. Or, 5.34) in a case that a DMRS port allocation value that the terminal is configured to use is a fifth set, at least one CDM group of the 2 CDM groups corresponds to one TCI state of the two TCI states. It may include:

5.341) according to a predefined rule, one TCI state is selected from the two TCI states, the at least one CDM group of the 2 CDM groups corresponds to the selected TCI state, and the remaining CDM groups correspond to the other TCI state. For example, the first CDM group selects the first TCI state, and the second CDM group selects the second TCI state. Or, 5.342) according to a DMRS port allocation value indicated in downlink control information (DCI), the correspondence between the two TCI states and the 2 CDM groups is determined, one DMRS port allocation value corresponds to two TCI states, and one TCI state corresponds to at least one CDM group. For example, a DMRS port allocation value (value as shown in Table 1 to Table 4) indicated in the DCI corresponds to a mapping relationship. For example, value m2 corresponds to that the first TCI state is selected for the first CDM group, and the second TCI state is selected for the second CDM group; value n2 corresponds to that the second TCI state is selected for the first CDM group, and the first TCI state is selected for the second CDM group . . . The specific value as used is not limited to the cases in Tables 1 to 4.

In the above 6.1), it may specifically include:

6.1) in a case that one resource is allocated to the terminal, the correspondence between the two TCI states and the 3 CDM groups is an eighth correspondence; where the eighth correspondence includes: according to a predefined rule, one TCI state is selected from the two TCI states, and the 3 CDM groups correspond to the selected TCI state; for example, if the network side instructs, through control information, the terminal to use one resource, the correspondence between the 3 CDM groups and the TCI states may be determined in the following manner: according to the predefined rule, one of the TCI states is selected for use, and the two CDM groups correspond to the selected TCI state. For example, the first TCI state is always selected. Or, 6.2) in a case that one resource is allocated to the terminal, the correspondence between the two TCI states and the 3 CDM groups is a ninth correspondence; where the ninth correspondence includes: according to a DMRS port allocation value indicated in downlink control information (DCI), the correspondence between the two TCI states and the 3 CDM groups is determined, one DMRS port allocation value corresponds to one TCI state, and the 3 CDM groups correspond to the selected TCI state; for example, if the network side instructs, through control information, the terminal to use one resource, the correspondence between the 3 CDM groups and the TCI states may be determined in the following manner: a DMRS port allocation value (value as shown in Table 1 to Table 4) indicated in the DCI Corresponds to a mapping relationship. For example, value m corresponds to the selection of the first TCI state, and value n corresponds to the selection of the second TCI state . . . The specific value as used is not limited to the cases in Tables 1 to 4. For example, value 0 in Table 1 corresponds to a situation where DMRS port 0 is allocated in a case of single codeword transmission. It may be predefined that: if there are two TCI states, the value corresponds to a case where the first TCI state is selected. In addition, a new value may be added in Table 1, DMRS port 0 is allocated for this value, but it corresponds to a case where the second TCI state is selected. Or, 6.3) in a case that at least two resources are allocated to the terminal, then on each resource, the 3 CDM groups correspond to one TCI state of the two TCI states. That is, if the network side instructs, through control information, the terminal to use more than one resource, then on each resource, the 3 CDM groups correspond to one of the TCI states. Specifically, it may include:

6.31) in a case that at least two time domain resources are allocated to the terminal, the correspondence between the 3 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources (corresponding to the TDM mode), and the correspondence between the 3 CDM groups and the TCI states is associated with serial numbers of mini slots or slots. For example, odd-numbered mini slots or slots use the first TCI state, and even-numbered mini slots or slots use the second TCI state; or, 6.32) in a case that at least two frequency domain resources are allocated to the terminal, the correspondence between the 3 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources (corresponding to the FDM mode), and the correspondence between the 3 CDM groups and the TCI states is associated with serial numbers of the frequency domain resources. For example, odd-numbered frequency domain resources use the first TCI state, and even-numbered frequency domain resources use the second TCI state; or, 6.33) in a case that at least two frequency domain and time domain resources are allocated to the terminal, the correspondence between the 3 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers. For example, the network side indicates multiple frequency domain and time domain resources (corresponding to the FDM+TDM mode), and the correspondence between the 3 CDM groups and the TCI states is associated with serial numbers of the frequency domain or time domain resources. For example, odd-numbered frequency domain or time domain resources use the first TCI state, and even-numbered frequency domain or time domain resources use the second TCI state.

In the above 6.2), it may specifically include:

6.21) determining, through signaling, that the correspondence between the two TCI states and the 3 CDM groups is a tenth correspondence; where the tenth correspondence includes: according to a predefined rule, one TCI state is selected from the two TCI states, and the 3 CDM groups correspond to the selected TCI state; for example, if the network side instructs, through control information, the terminal to use a corresponding mode E, the correspondence between the CDM groups and the TCI states may be determined in the following manner: according to the predefined rule, one of the TCI states is selected for use, and the 3 CDM groups correspond to the selected TCI state. For example, the first TCI state is always selected. Or, 6.22) determining, through signaling, that the correspondence between the two TCI states and the 3 CDM groups is an eleventh correspondence; where the eleventh correspondence includes: according to a DMRS port allocation value indicated in downlink control information (DCI), the correspondence between two TCI states and the 3 CDM groups is determined, one DMRS port allocation value corresponds to one TCI state, and the 3 CDM groups correspond to the selected TCI state; for example, a DMRS port allocation value (value as shown in Table 1 to Table 4 or value in a newly defined DMRS table) indicated in the DCI corresponds to a mapping relationship. For example, value m corresponds to the selection of the first TCI state, and value n corresponds to the selection of the second TCI state . . . The specific value as used is not limited to the cases in Tables 1 to 4. Or, 6.23) determining, through signaling, that the correspondence between two TCI states and the 3 CDM groups is a twelfth correspondence, where the twelfth correspondence includes: on each resource, at least one CDM group of the 3 CDM groups corresponds to one TCI state of the two TCI states; it may specifically include:

6.231) in a case that at least two time domain resources are allocated to the terminal, the correspondence between the 3 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates that the corresponding mode is TDM mode, and the correspondence between the 3 CDM groups and the TCI states is associated with serial numbers of mini slots or slots. For example, the 3 CDM groups on odd-numbered mini slots or slots use the first TCI state, and the 3 CDM groups on even-numbered mini slots or slots use the second TCI state. Or, 6.232) in a case that at least two frequency domain resources are allocated to the terminal, the correspondence between the 3 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates that the corresponding mode is FDM mode, and the correspondence between the 3 CDM groups and the TCI states is associated with serial numbers of the frequency domain resources. For example, for odd-numbered frequency domain resources, the 3 CDM groups use the first TCI state, and for even-numbered frequency domain resources, the 3 CDM groups use the second TCI state. Or, 6.233) in a case that at least two frequency domain and time domain resources are allocated to the terminal, the correspondence between the 3 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers. For example, the network side indicates that the corresponding mode is FDM+TDM mode, and the correspondence between the 3 CDM groups and the TCI states is associated with serial numbers of the frequency domain or time domain resources. For example, for odd-numbered frequency domain or time domain resources, the 3 CDM groups use the first TCI state, and for even-numbered frequency domain or time domain resources, the 3 CDM groups use the second TCI state. Or, 6.24) determining, through signaling, that the correspondence between the two TCI states and the 3 CDM groups is a thirteenth correspondence; where the thirteenth correspondence includes: according to a predefined rule, one TCI state of the two TCI states is selected, at least one CDM group of the 3 CDM groups corresponds to the selected TCI state, and the remaining CDM groups correspond to the other TCI state; for example, the network side indicates that the corresponding mode is eMBB service or SDM mode, 2 CDM groups thereof correspond to one TCI state, the other CDM groups corresponds to the other TCI state, and the correspondence between the CDM groups and the TCI states may be determined in the following manner: according to the predefined rule. For example, the first TCI state is selected for one of the CDM groups, and the second TCI state is selected for the other two of the CDM groups. Or, 6.25) determining, through signaling, that the correspondence between the two TCI states and the 3 groups is a fourteenth correspondence; where the fourteenth correspondence includes: according to a DMRS port allocation value indicated in downlink control information (DCI), the correspondence between the two TCI states and the 3 CDM groups is determined, one DMRS port allocation value corresponds to two TCI states, and one TCI state corresponds to at least one CDM group. For example, a DMRS port allocation value (value as shown in Table 1 to Table 4 or value in a newly defined DMRS table) indicated in the DCI corresponds to a mapping relationship. For example, value m2 corresponds to that the first TCI state is selected for one of the CDM groups, and the second TCI state is selected for the other two of the CDM groups; value n2 corresponds to that the second TCI state is selected for one of the CDM groups, and the first TCI state is selected for the other two of the CDM groups . . . The specific value as used is not limited to the cases in Tables 1 to 4.

In the above 6.3), it may specifically include:

6.31) in a case that a DMRS port allocation value that the terminal is configured to use is a third set, determining that the correspondence between the two TCI states and the 3 CDM groups is an eleventh correspondence; where the eleventh correspondence includes: according to a predefined rule, one TCI state is selected from the two TCI states, and the 3 CDM groups correspond to the selected TCI state; for example, if the network side instructs, through control information, the terminal to use a value set X2, the correspondence between the CDM groups and the TCI states may be determined in the following manner: according to the predefined rule, one of the TCI states is selected for use, and the 3 CDM groups correspond to the selected TCI state. For example, the first TCI state is always selected. Or, 6.32) in a case that a DMRS port allocation value that the terminal is configured to use is a third set, determining that the correspondence between the two TCI states and the 3 CDM groups is a twelfth correspondence; where the twelfth correspondence includes: according to a DMRS port allocation value indicated in downlink control information (DCI), the correspondence between the two TCI states and the 3 CDM groups is determined, one DMRS port allocation value corresponds to one TCI state, and the 3 CDM groups correspond to the selected TCI state; if the network side instructs, through control information, the terminal to use a value set X2, the correspondence between the CDM groups and the TCI states may be determined in the following manner: a DMRS port allocation value (value as shown in Table 1 to Table 4 or value in a newly defined DMRS table) indicated in the DCI corresponds to a mapping relationship. For example, value m1 (belonging to value set X1) corresponds to the selection of the first TCI state, and value n1 (also belonging to value set X1) corresponds to the selection of the second TCI state . . . The specific value as used is not limited to the cases in Tables 1 to 4. Or, The above 6.33) in a case that a DMRS port allocation value that the terminal is configured to use is a fourth set, then on each resource, the 3 CDM groups correspond to one TCI state of the two TCI states; that is, if the network side instructs, through control information, the terminal to use a value set Y2, then on each resource, the 3 CDM groups correspond to one of the TCI states.

6.331) in a case that at least two time domain resources are allocated to the terminal, the correspondence between the 3 CDM groups and the TCI states is associated with serial numbers of mini slots or slots, one TCI state of the two TCI states is used for mini slots or slots with one type of serial number, and different TCI states are used for mini slots or slots with different types of serial numbers; for example, the network side indicates multiple time domain resources or the network side indicates that the corresponding mode is TDM mode, and the correspondence between the 3 CDM groups and the TCI states is associated with serial numbers of mini slots or slots. For example, the 3 CDM groups on odd-numbered mini slots or slots use the first TCI state, and the 3 CDM groups on even-numbered mini slots or slots use the second TCI state; or, 6.332) in a case that at least two frequency domain resources are allocated to the terminal, the correspondence between the 3 CDM groups and the TCI states is associated with serial numbers of the frequency domain resources, one TCI state of the two TCI states is used for frequency domain resources with one type of serial number, and different TCI states are used for frequency domain resources with different types of serial numbers; for example, the network side indicates multiple frequency domain resources or the network side indicates that the corresponding mode is FDM mode, and the correspondence between the 3 CDM groups and the TCI states is associated with serial numbers of the frequency domain resources. For example, the 3 CDM groups on odd-numbered frequency domain resources use the first TCI state, and the 3 CDM groups on even-numbered frequency domain resources use the second TCI state; or, 6.333) in a case that at least two frequency domain and time domain resources are allocated to the terminal, the correspondence between the 3 CDM groups and the TCI states is associated with serial numbers of the frequency domain or time domain resources, one TCI state of the two TCI states is used for frequency domain or time domain resources with one type of serial number, and different TCI states are used for frequency domain or time domain resources with different types of serial numbers; for example, the network side indicates multiple frequency domain and time domain resources or the network side indicates that the corresponding mode is FDM+TDM mode, and the correspondence between the 3 CDM groups and the TCI states is associated with serial numbers of the frequency domain or time domain resources. For example, the 3 CDM groups on odd-numbered frequency domain or time domain resources use the first TCI state, and the 3 CDM groups on even-numbered frequency domain or time domain resources use the second TCI state.

6.34) in a case that a DMRS port allocation value that the terminal is configured to use is a fifth set, at least one CDM group of the 3 CDM groups corresponds to one TCI state of the two TCI states. It may include:

6.341) according to a predefined rule, one TCI state is selected from the two TCI states, the at least one CDM group of the 3 CDM groups corresponds to the selected TCI state, and the remaining CDM groups correspond to the other TCI state. For example, if the network side instructs, through control information, the terminal to use a value set Z2 (corresponding to eMBB service or SDM mode), 1 CDM group thereof correspond to one TCI state, the other two CDM groups corresponds to the other TCI state, and the correspondence between the CDM groups and the TCI states may be determined in the following manner: according to the predefined rule. For example, the first TCI state is selected for one of the CDM groups, and the second TCI state is selected for the other two of the CDM groups. Or, 6.342) according to a DMRS port allocation value indicated in downlink control information (DCI), the correspondence between the two TCI states and the 3 CDM groups is determined, one DMRS port allocation value corresponds to two TCI states, and one TCI state corresponds to at least one CDM group. For example, a DMRS port allocation value (value as shown in Table 1 to Table 4) indicated in the DCI corresponds to a mapping relationship. For example, value m2 corresponds to that the first TCI state is selected for 1 CDM group, and the second TCI state is selected for the other two CDM groups; value n2 corresponds to that the second TCI state is selected for 1 CDM group, and the first TCI state is selected for the other two CDM groups . . . The specific value as used is not limited to the cases in Tables 1 to 4.

In other embodiments of the present disclosure, the quantity of TCI states may be 3 or more, and when there are 1 or 2 or 3 CDM groups, the correspondence between the TCI states and the CDM groups is similar to the correspondence in a case where there are 2 TCI states. For example, when there are 3 TCI states and 3 CDM groups, one of the TCIs is selected, and the CDM groups correspond to the selected TCI; in some cases, it may be that a CDM group 1 corresponds to TCI1, a CDM group 2 corresponds to TCI2, and a CDM group 3 corresponds to TCI3; or, in some cases, it may be that a CDM group 1 and a CDM group 2 corresponds to TCI1, and a CDM group 3 corresponds to TCI3; or, in some cases, it may be that a CDM group 1 and a CDM Group 3 corresponds to TCI1, and a CDM group 2 corresponds to TCI2; which may be determined according to specific implementation scenarios.

In the above embodiments of the present disclosure, by determining the correspondence between the CDM groups and the TCI states, the terminal can determine the used transmission mode and the correspondence between the CDM group and the TCI state, thereby improving the reliability of transmission.

The embodiments of the present disclosure also provide a method for sending information, which is applied to a network device, and the method includes:

sending indication information, where the indication information is used for indicating at least one transmission configuration indicator (TCI) state of a demodulation reference signal (DMRS) port on one or more resources allocated to a terminal; and sending information to the terminal, where the terminal receives the information according to a determined correspondence between the at least one TCI state on the one or more resources and a code division multiplexing (CDM) group to which the DMRS port belongs.

In some embodiments, the correspondence between the at least one TCI state on the one or more resources and the CDM group to which the DMRS port belongs comprises: one TCI state on the one or more resources corresponds to N CDM groups, or, two TCI states on the one or more resources correspond to N CDM groups, where N is equal to 1, 2, or 3.

In some embodiments, in a case that two TCI states on the one or more resources correspond to one CDM group, the correspondence between the TCI state and the CDM group to which the DMRS port belongs comprises: on each resource of the one or more resources, the CDM group corresponding to one TCI state of the two TCI states.

In some embodiments, the CDM group corresponding to one TCI state of the two TCI states comprises: in a case that at least two resources are allocated to the terminal, then on each resource of the at least two resources, the CDM group corresponds to one TCI state of the two TCI states.

In some embodiments, on each resource of the one or more resources, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers.

In some embodiments, the method for sending information further includes: in a case that two TCI states on the one or more resources correspond to 2 or 3 CDM groups, sending signaling to the terminal, where the signaling is used for indicating the correspondence between the two TCI states on the one or more resources and the 2 or 3 CDM groups.

It should be noted that the above FIG. 1 and all its implementation manners are applicable to these embodiments, and the same technical effects can also be achieved.

Figure 2:
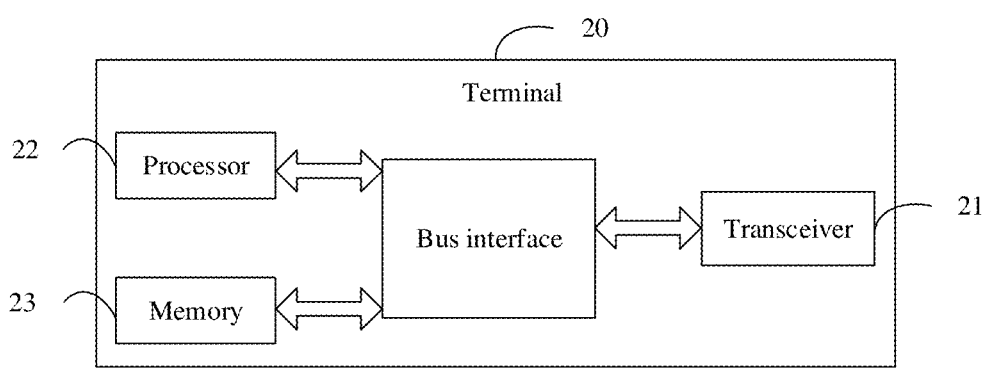
FIG. 2 is a schematic diagram of an architecture of a terminal according to the present disclosure.

As shown in FIG. 2, embodiments of the present disclosure also provide a terminal 20, including a processor 22, a transceiver 21, and a memory 23. The memory 23 stores a program executable by the processor 22, and the processor 22, when executing the program, performs the following steps:

receiving indication information, where the indication information is used for indicating at least one transmission configuration indicator (TCI) state of a demodulation reference signal (DMRS) port on one or more resources allocated to the terminal;

determining a correspondence between the at least one TCI state on the one or more resources and a code division multiplexing (CDM) group to which the DMRS port belongs; and receiving information according to the correspondence between the TCI state on the one or more resources and the CDM group to which the DMRS port belongs.

The determining the correspondence between the at least one TCI state on the one or more resources and the CDM group to which the DMRS port belongs includes: determining that one TCI state on the one or more resources corresponds to N CDM groups, or, determining that two TCI states on the one or more resources correspond to N CDM groups, where N is equal to 1, 2, or 3.

In a case that there are two TCI states and one CDM group, the determining the correspondence between the TCI state and the CDM group to which the DMRS port belongs includes: determining the correspondence between the two TCI states and the one CDM group according to the resources allocated to the terminal; or, receiving signaling and determining the correspondence between the two TCI states and the one CDM group according to the signaling; or, on each resource, the CDM group corresponding to one TCI state of the two TCI states; or, determining the correspondence between the two TCI states and the one CDM group according to a DMRS port allocation value indicated in a DMRS table by a network side.

The determining the correspondence between the two TCI states and the one CDM group according to the resources allocated to the terminal includes:

in a case that one resource is allocated to the terminal, the correspondence between the two TCI states and the one CDM group is a first correspondence or a second correspondence; where the first correspondence includes: according to a predefined rule, one TCI state is selected from the two TCI states, and the CDM group corresponds to the selected TCI state; where the second correspondence includes: according to a DMRS port allocation value indicated in downlink control information (DCI), the correspondence between the two TCIs states and the one CDM group is determined, one DMRS port allocation value corresponds to one TCI state, and the CDM group corresponds to the selected TCI state;

in a case that at least two resources are allocated to the terminal, then on each resource, the CDM group corresponds to one TCI state of the two TCI states.

The determining the correspondence between the two TCI states and the one CDM group according to the signaling includes:

determining, through the signaling, that the correspondence between the two TCI states and the one CDM group is a third correspondence or a fourth correspondence; where the third correspondence includes: according to a predefined rule, one TCI state is selected from the two TCI states, and the CDM group corresponds to the selected TCI state; where the fourth correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, determining, through the signaling, that the correspondence between the two TCI states and the one CDM group is a fifth correspondence, where the fifth correspondence includes: on each resource, the CDM group corresponds to one TCI state of the two TCI states.

The determining the correspondence between the two TCI states and the one CDM group according to the DMRS port allocation value indicated in the DMRS table by the network side includes:

in a case that a DMRS port allocation value that the terminal is configured to use is a first set, determining that the correspondence between the two TCI states and the one CDM group is a sixth correspondence or a seventh correspondence; where the sixth correspondence includes: according to a predefined rule, one TCI state is selected from the two TCI states, and the CDM group corresponds to the selected TCI state; where the seventh correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, in a case that a DMRS port allocation value that the terminal is configured to use is a second set, then on each resource, the CDM group corresponding to one TCI state of the two TCI states.

On each resource, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; or, in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial numbers, and different TCI states are used for frequency domain or time domain resources with different types of serial numbers.

In a case that there are two TCI states and 2 or 3 CDM groups, the determining the correspondence between the at least one TCI state and the CDM group to which the DMRS port belongs includes: determining the correspondence between the two TCI states and the 2 or 3 CDM groups according to the resources allocated to the terminal; or, receiving signaling and determining the correspondence between the two TCI states and the 2 or 3 CDM groups according to the signaling; or, determining the correspondence between the two TCI states and the 2 or 3 CDM groups according to a DMRS port allocation value indicated in a DMRS table by a network side.

The determining the correspondence between the two TCI states and the 2 or 3 CDM groups according to the resources allocated to the terminal includes:

in a case that one resource is allocated to the terminal, the correspondence between the two TCI states and the 2 or 3 CDM groups is an eighth correspondence or a ninth correspondence; where the eighth correspondence includes: according to a predefined rule, one TCI state is selected from the two TCI states, and the 2 or 3 CDM groups correspond to the selected TCI state; where the ninth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state;

in a case that at least two resources are allocated to the terminal, then on each resource, the 2 or 3 CDM groups correspond to one TCI state of the two TCI states.

The determining the correspondence between the two TCI states and the 2 or 3 CDM groups according to the signaling includes:

determining, through signaling, that the correspondence between the two TCI states and the 2 or 3 CDM groups is a tenth correspondence or an eleventh correspondence; where the tenth correspondence includes: according to a predefined rule, one TCI state is selected from the two TCI states, and the 2 or 3 CDM groups correspond to the selected TCI state; where the eleventh correspondence includes: according to a DMRS port allocation value indicated in downlink control information (DCI), the correspondence between two TCI states and the 2 or 3 CDM groups is determined, one DMRS port allocation value corresponds to one TCI state, and the 2 or 3 CDM groups correspond to the selected TCI state; or, determining, through signaling, that the correspondence between two TCI states and the 2 or 3 CDM groups is a twelfth correspondence, where the twelfth correspondence includes: on each resource, at least one CDM group of the 2 or 3 CDM groups corresponds to one TCI state of the two TCI states; or, determining, through signaling, that the correspondence between the two TCI states and the 2 or 3 CDM groups is a thirteenth correspondence or a fourteenth correspondence; where the thirteenth correspondence includes: according to a predefined rule, one TCI state of the two TCI states is selected, at least one CDM group of the 2 or 3 CDM groups corresponds to the selected TCI state, and the remaining CDM groups correspond to the other TCI state; where the fourteenth correspondence includes: according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The determining the correspondence between the two TCI states and the 2 or 3 CDM groups according to the DMRS port allocation value indicated in the DMRS table by the network side includes:

in a case that a DMRS port allocation value that the terminal is configured to use is a third set, determining that the correspondence between the two TCI states and the 2 or 3 CDM groups is an eleventh correspondence or a twelfth correspondence; where the eleventh correspondence includes: according to a predefined rule, one TCI state is selected from the two TCI states, and the 2 or 3 CDM groups correspond to the selected TCI state; where the twelfth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state; or, in a case that a DMRS port allocation value that the terminal is configured to use is a fourth set, then on each resource, the 2 or 3 CDM groups correspond to one TCI state of the two TCI states; or, in a case that a DMRS port allocation value that the terminal is configured to use is a fifth set, at least one CDM group of the 2 or 3 CDM groups corresponds to one TCI state of the two TCI states.

On each resource, the 2 or 3 CDM groups corresponding to one TCI state of the two TCI states includes:

in a case that at least two time domain resources are allocated to the terminal, the correspondence between the 2 or 3 CDM groups and the TCI states is associated with serial numbers of mini slots or slots, one TCI state of the two TCI states is used mini slots or slots with one type of serial number, and different TCI states are used for mini slots or slots with different types of serial numbers; or, in a case that at least two frequency domain resources are allocated to the terminal, the correspondence between the 2 or 3 CDM groups and the TCI states is associated with serial numbers of the frequency domain resources, one TCI state of the two TCI states is used frequency domain resources with one type of serial number, and different TCI states are used for frequency domain resources with different types of serial numbers; or, in a case that at least two frequency domain and time domain resources are allocated to the terminal, the correspondence between the 2 or 3 CDM groups and the TCI states is associated with serial numbers of the frequency domain or time domain resources, one TCI state of the two TCI states is used frequency domain or time domain resources with one type of serial number, and different TCI states are used for frequency domain or time domain resources with different types of serial numbers.

The at least one CDM group of the 2 or 3 CDM groups corresponding to one TCI state of the two TCI states includes: according to a predefined rule, one TCI state is selected from the two TCI states, the at least one CDM group of the 2 or 3 CDM groups corresponds to the selected TCI state, and the remaining CDM groups correspond to the other TCI state; or, according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

In the terminal, the transceiver 21 and the memory 23, as well as the transceiver 21 and the processor 22, may be connected through a bus interface. The functions of the processor 22 may be realized by the transceiver 21, and the functions of the transceiver 21 may be realized by the processor 22. All the implementations of FIG. 1 are also applicable to the embodiments of the terminal, and the same technical effects can also be achieved.

The embodiments of the present disclosure also provide a device for receiving information, including:

a receiving and sending module, configured to receive indication information, where the indication information is used for indicating at least one transmission configuration indicator (TCI) state of a demodulation reference signal (DMRS) port on one or more resources allocated to the terminal; and a processing module, configured to determine a correspondence between the at least one TCI state on the one or more resources and a code division multiplexing (CDM) group to which the DMRS port belongs; and where the receiving and sending module is further configured to receive information according to the correspondence between the TCI state on the one or more resources and the CDM group to which the DMRS port belongs.

The determining the correspondence between the at least one TCI state on the one or more resources and the CDM group to which the DMRS port belongs includes: determining that one TCI state on the one or more resources corresponds to N CDM groups, or, determining that two TCI states on the one or more resources correspond to N CDM groups, where N is equal to 1, 2, or 3.

In a case that there are two TCI states and one CDM group, the determining the correspondence between the TCI state and the CDM group to which the DMRS port belongs includes: determining the correspondence between the two TCI states and the one CDM group according to the resources allocated to the terminal; or, receiving signaling and determining the correspondence between the two TCI states and the one CDM group according to the signaling; or, on each resource, the CDM group corresponding to one TCI state of the two TCI states; or, determining the correspondence between the two TCI states and the one CDM group according to a DMRS port allocation value indicated in a DMRS table by a network side.

The determining the correspondence between the two TCI states and the one CDM group according to the resources allocated to the terminal includes:

in a case that one resource is allocated to the terminal, the correspondence between the two TCI states and the one CDM group is a first correspondence or a second correspondence; where the first correspondence includes: according to a predefined rule, one TCI state is selected from the two TCI states, and the CDM group corresponds to the selected TCI state; where the second correspondence includes: according to a DMRS port allocation value indicated in downlink control information (DCI), the correspondence between the two TCIs states and the one CDM group is determined, one DMRS port allocation value corresponds to one TCI state, and the CDM group corresponds to the selected TCI state;

in a case that at least two resources are allocated to the terminal, then on each resource, the CDM group corresponds to one TCI state of the two TCI states.

The determining the correspondence between the two TCI states and the one CDM group according to the signaling includes:

determining, through the signaling, that the correspondence between the two TCI states and the one CDM group is a third correspondence or a fourth correspondence; where the third correspondence includes: according to a predefined rule, one TCI state is selected from the two TCI states, and the CDM group corresponds to the selected TCI state; where the fourth correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, determining, through the signaling, that the correspondence between the two TCI states and the one CDM group is a fifth correspondence, where the fifth correspondence includes: on each resource, the CDM group corresponds to one TCI state of the two TCI states.

The determining the correspondence between the two TCI states and the one CDM group according to the DMRS port allocation value indicated in the DMRS table by the network side includes:

in a case that a DMRS port allocation value that the terminal is configured to use is a first set, determining that the correspondence between the two TCI states and the one CDM group is a sixth correspondence or a seventh correspondence; where the sixth correspondence includes: according to a predefined rule, one TCI state is selected from the two TCI states, and the CDM group corresponds to the selected TCI state; where the seventh correspondence includes: according to a DMRS port allocation value indicated in downlink control information (DCI), the correspondence between the two TCI states and the one CDM group is determined, one DMRS port allocation value corresponds to one TCI state, and the one CDM group corresponds to the selected TCI state; or, in a case that a DMRS port allocation value that the terminal is configured to use is a second set, then on each resource, the CDM group corresponding to one TCI state of the two TCI states.

On each resource, the CDM group corresponding to one TCI state of the two TCI states includes:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers; or, in a case that at least two frequency domain resources are allocated to the terminal, the correspondence between the one CDM group and the TCI states is associated with serial numbers of the frequency domain resources, one TCI state of the two TCI states is used for frequency domain resources with one type of serial number, and different TCI states are used for frequency domain resources with different types of serial numbers; or, in a case that at least two frequency domain and time domain resources are allocated to the terminal, the correspondence between the one CDM group and the TCI states is associated with serial numbers of the frequency domain or time domain resources, one TCI state of the two TCI states is used for frequency domain or time domain resources with one type of serial numbers, and different TCI states are used for frequency domain or time domain resources with different types of serial numbers.

In a case that there are two TCI states and 2 or 3 CDM groups, the determining the correspondence between the at least one TCI state and the CDM group to which the DMRS port belongs includes: determining the correspondence between the two TCI states and the 2 or 3 CDM groups according to the resources allocated to the terminal; or, receiving signaling and determining the correspondence between the two TCI states and the 2 or 3 CDM groups according to the signaling; or, determining the correspondence between the two TCI states and the 2 or 3 CDM groups according to a DMRS port allocation value indicated in a DMRS table by a network side.

The determining the correspondence between the two TCI states and the 2 or 3 CDM groups according to the resources allocated to the terminal includes:

in a case that one resource is allocated to the terminal, the correspondence between the two TCI states and the 2 or 3 CDM groups is an eighth correspondence or a ninth correspondence; where the eighth correspondence includes: according to a predefined rule, one TCI state is selected from the two TCI states, and the 2 or 3 CDM groups correspond to the selected TCI state; where the ninth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state;

in a case that at least two resources are allocated to the terminal, then on each resource, the 2 or 3 CDM groups correspond to one TCI state of the two TCI states.

The determining the correspondence between the two TCI states and the 2 or 3 CDM groups according to the signaling includes:

determining, through signaling, that the correspondence between the two TCI states and the 2 or 3 CDM groups is a tenth correspondence or an eleventh correspondence; where the tenth correspondence includes: according to a predefined rule, one TCI state is selected from the two TCI states, and the 2 or 3 CDM groups correspond to the selected TCI state; where the eleventh correspondence includes: according to a DMRS port allocation value indicated in downlink control information (DCI), the correspondence between two TCI states and the 2 or 3 CDM groups is determined, one DMRS port allocation value corresponds to one TCI state, and the 2 or 3 CDM groups correspond to the selected TCI state; or, determining, through signaling, that the correspondence between two TCI states and the 2 or 3 CDM groups is a twelfth correspondence, where the twelfth correspondence includes: on each resource, at least one CDM group of the 2 or 3 CDM groups corresponds to one TCI state of the two TCI states; or, determining, through signaling, that the correspondence between the two TCI states and the 2 or 3 CDM groups is a thirteenth correspondence or a fourteenth correspondence; where the thirteenth correspondence includes: according to a predefined rule, one TCI state of the two TCI states is selected, at least one CDM group of the 2 or 3 CDM groups corresponds to the selected TCI state, and the remaining CDM groups correspond to the other TCI state; where the fourteenth correspondence includes: according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

The determining the correspondence between the two TCI states and the 2 or 3 CDM groups according to the DMRS port allocation value indicated in the DMRS table by the network side includes:

in a case that a DMRS port allocation value that the terminal is configured to use is a third set, determining that the correspondence between the two TCI states and the 2 or 3 CDM groups is an eleventh correspondence or a twelfth correspondence; where the eleventh correspondence includes: according to a predefined rule, one TCI state is selected from the two TCI states, and the 2 or 3 CDM groups correspond to the selected TCI state; where the twelfth correspondence includes: according to a DMRS port allocation value indicated in downlink control information (DCI), the correspondence between the two TCI states and the 2 or 3 CDM groups is determined, one DMRS port allocation value corresponds to one TCI state, and the 2 or 3 CDM groups correspond to the selected TCI state; or, in a case that a DMRS port allocation value that the terminal is configured to use is a fourth set, then on each resource, the 2 or 3 CDM groups correspond to one TCI state of the two TCI states; or, in a case that a DMRS port allocation value that the terminal is configured to use is a fifth set, at least one CDM group of the 2 or 3 CDM groups corresponds to one TCI state of the two TCI states.

On each resource, the 2 or 3 CDM groups corresponding to one TCI state of the two TCI states includes:

in a case that at least two time domain resources are allocated to the terminal, the correspondence between the 2 or 3 CDM groups and the TCI states is associated with serial numbers of mini slots or slots, one TCI state of the two TCI states is used mini slots or slots with one type of serial number, and different TCI states are used for mini slots or slots with different types of serial numbers; or, in a case that at least two frequency domain resources are allocated to the terminal, the correspondence between the 2 or 3 CDM groups and the TCI states is associated with serial numbers of the frequency domain resources, one TCI state of the two TCI states is used frequency domain resources with one type of serial number, and different TCI states are used for frequency domain resources with different types of serial numbers; or, in a case that at least two frequency domain and time domain resources are allocated to the terminal, the correspondence between the 2 or 3 CDM groups and the TCI states is associated with serial numbers of the frequency domain or time domain resources, one TCI state of the two TCI states is used frequency domain or time domain resources with one type of serial number, and different TCI states are used for frequency domain or time domain resources with different types of serial numbers.

The at least one CDM group of the 2 or 3 CDM groups corresponding to one TCI state of the two TCI states includes: according to a predefined rule, one TCI state is selected from the two TCI states, the at least one CDM group of the 2 or 3 CDM groups corresponds to the selected TCI state, and the remaining CDM groups correspond to the other TCI state; or, according to a DMRS port allocation value indicated in downlink control information (DCI), the correspondence between the two TCI states and the 2 or 3 CDM groups is determined, one DMRS port allocation value corresponds to two TCI states, and one TCI state corresponds to at least one CDM group.

All the above implementations of FIG. 1 are applicable to the embodiments of the device, and the same technical effects can also be achieved.

The embodiments of the present disclosure also provide a network device, including: a processor, a transceiver, and a memory, the memory stores a program executable by the processor, and the processor, where executing, the program, performs the following steps:

sending indication information, where the indication information is used for indicating at least one transmission configuration indicator (TCI) state of a demodulation reference signal (DMRS) port allocated to a terminal; and sending information to the terminal, where the terminal receives the information according to a determined correspondence between the at least one TCI state on the one or more resources and a code division multiplexing (CDM) group to which the DMRS port belongs.

All the above implementations of FIG. 1 are also applicable to the embodiments of the network device, and the same technical effects can also be achieved.

Embodiments of the present disclosure also provide a device for sending information, which includes:

a receiving and sending module, configured to send indication information, where the indication information is used for indicating at least one transmission configuration indicator (TCI) state of a demodulation reference signal (DMRS) port on one or more resources allocated to a terminal;

where the receiving and sending module is further configured to send information to the terminal, where the terminal receives the information according to a determined correspondence between the at least one TCI state on the one or more resources and a code division multiplexing (CDM) group to which the DMRS port belongs.

All the above implementations of FIG. 1 are applicable to the embodiments of the device, and the same technical effects can also be achieved.

The embodiments of the present disclosure also provide a computer storage medium, which has instructions, and the instructions, when being executed by a computer, configure the computer to perform the method on the terminal side or the method on the network device side described above.

In the above embodiments of the present disclosure, by determining the correspondence between the CDM groups and the TCI states, the terminal can determine the used transmission mode and the correspondence between the CDM groups and the TCI states, thereby improving the reliability of transmission.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a detailed description thereof is not provided herein.

For the embodiments according to the present disclosure, it should be understood that the disclosed device and method may be implemented in other ways. For example, the described embodiments directed to the device are merely exemplary.

For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method described in the various embodiments of the present disclosure. The storage medium includes a USB flash disk, a mobile hard disk, an ROM, an RAM, a magnetic disk, an optical disk, and other medium which may store program code.

In addition, it should be noted that in the device and the method of the present disclosure, it is apparent that various components or various steps may be decomposed and/or recombined. The decomposition and/or recombination should be considered as equivalents of the present disclosure. Moreover, the steps of performing the above series of processes may naturally be performed in a chronological order or in an order as illustrated, but not necessarily be required to be performed in a chronological order, and some steps may be performed in parallel or independently of each other. It should be noted that, a person ordinary skilled in the art can understand that all or any steps or components of the method and device in the present disclosure may be implemented with hardware, firmware, software or any combination thereof in any computing device (including a processor and a storage medium and so on) or in a network of computing devices, which can be realized by a person skilled in the art with their basic programming skills on the basis of the present disclosure.

Therefore, the objects of the present disclosure may be achieved through running a program or a group of programs on any computing device. The computing device may be a well-known common device. Accordingly, the object of the present disclosure may be achieved by merely providing a program product having program codes for implementing the method or device. That is, such a program product is included in the present disclosure, so is a storage medium storing such a program product thereon. Apparently, the storage medium may be any well-known storage medium or any storage medium developed in the future. It should be further pointed out that, in the device and method of the present disclosure, each component or step may be divided or recombined. The dividing and recombining should be regarded as equivalent solutions of the present disclosure. In addition, the steps in the present disclosure may be performed sequentially according to the described order. It is not required that the steps may only be performed sequentially. Some steps may be performed in parallel or independently.

The various modules, units, subunits or submodules may be one or more integrated circuits configured to implement the above methods, such as one or more application specific integrated circuits (Application Specific Integrated Circuit, ASIC), or one or more microprocessors, or one or more digital signal processors (Digital Signal Processor, DSP), or one or more field programmable gate arrays (Field Programmable Gate Array, FPGA), etc. As another example, when a module described above is implemented in the form of scheduling program codes by a processing element, the processing element may be a general purpose processor, such as a central processing unit (Central Processing Unit, CPU) or other processors that may call program codes. As another example, these modules may be integrated together and implemented as a system-on-a-chip (System-on-a-chip, SOC).

The terms "first", "second", etc. in the specification and claims of the present disclosure are used to distinguish similar objects, and not necessarily used to describe a specific sequence or sequence. It should be understood that the data used in this way can be interchanged under appropriate circumstances so that the embodiments of the present disclosure described herein are, for example, implemented in a sequence other than those illustrated or described herein. In addition, the terms such as "having" and "including" or any other variants thereof, are intended to cover a non-exclusive inclusion, such that a process, method, article, or apparatus that includes a list of elements not only include those elements but may also include other elements that are not expressly listed or that are inherent to such process, method, article, or apparatus. In addition, the use of "and/or" in the specification and claims means at least one of the connected objects, for example, A and/or B and/or C means 7 situations including A alone, B alone, C alone, both A and B, both B and C, both A and C, and all of A, B and C. Similarly, the use of "at least one of A and B" in this specification and claims should be understood as "A alone, B alone, or both A and B".

Optional embodiments of the present disclosure are described in the above. It should be noted that those skilled in the art may make various improvements and modifications without departing from the principles described in the present disclosure, and the various improvements and modifications fall within the protection scope of the present disclosure.

What is claimed is:

1. A method for receiving information, comprising:
    receiving indication information, wherein the indication information is used for indicating at least one transmission configuration indicator (TCI) state of a demodulation reference signal (DMRS) port on one or more resources allocated to a terminal;
    determining a correspondence between the at least one TCI state on the one or more resources and a code division multiplexing (CDM) group to which the DMRS port belongs; and
    receiving information according to the correspondence between the TCI state on the one or more resources and the CDM group to which the DMRS port belongs;
    wherein the determining the correspondence between the at least one TCI state on the one or more resources and the CDM group to which the DMRS port belongs comprises:
    determining that two TCI states on the one or more resources correspond to N CDM groups, where N is equal to 1;
    wherein in a case that it is determined that two TCI states on the one or more resources correspond to one CDM group, the determining the correspondence between the two TCI states and the CDM group to which the DMRS port belongs comprises:
    on each resource of the one or more resources, the CDM group corresponding to one TCI state of the two TCI states;
    wherein on each resource of the one or more resources, the CDM group corresponding to one TCI state of the two TCI states comprises:
    in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers.

2. The method for receiving information according to claim 1, wherein the CDM group corresponding to one TCI state of the two TCI states comprises:
    in a case that at least two resources are allocated to the terminal, then on each resource of the at least two resources, the CDM group corresponds to one TCI state of the two TCI states.

3. The method for receiving information according to claim 1, wherein in a case that it is determined that two TCI states on the one or more resources correspond to 2 or 3 CDM groups, the determining the correspondence between the at least one TCI state and the CDM group to which the DMRS port belongs comprises:
    receiving signaling and determining the correspondence between the two TCI states and the 2 or 3 CDM groups according to the signaling; determining the correspondence between the two TCI states and the 2 or 3 CDM groups.

4. A method for sending information, comprising:
    sending indication information, wherein the indication information is used for indicating at least one transmission configuration indicator (TCI) state of a demodulation reference signal (DMRS) port on one or more resources allocated to a terminal; and
    sending information to the terminal, wherein the terminal receives the information according to a determined correspondence between the at least one TCI state on the one or more resources and a code division multiplexing (CDM) group to which the DMRS port belongs;
    wherein the correspondence between the at least one TCI state on the one or more resources and the CDM group to which the DMRS port belongs comprises:
    two TCI states on the one or more resources correspond to N CDM groups, where N is equal to 1;
    wherein in a case that two TCI states on the one or more resources correspond to one CDM group, the correspondence between the two TCI states and the CDM group to which the DMRS port belongs comprises:
    on each resource of the one or more resources, the CDM group corresponding to one TCI state of the two TCI states
    wherein on each resource of the one or more resources, the CDM group corresponding to one TCI state of the two TCI states comprises:
    in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers.

5. The method for sending information according to claim 4, wherein the CDM group corresponding to one TCI state of the two TCI states comprises:

in a case that at least two resources are allocated to the terminal, then on each resource of the at least two resources, the CDM group corresponds to one TCI state of the two TCI states.

6. The method for sending information according to claim 4, further comprising:

in a case that two TCI states on the one or more resources correspond to 2 or 3 CDM groups, sending signaling to the terminal, wherein the signaling is used for indicating the correspondence between the two TCI states on the one or more resources and the 2 or 3 CDM groups.

7. A terminal, comprising: a processor, a transceiver and a memory, wherein the memory stores a program executable by the processor, and the processor, when executing the program, performs the following steps:

receiving indication information, wherein the indication information is used for indicating at least one transmission configuration indicator (TCI) state of a demodulation reference signal (DMRS) port on one or more resources allocated to the terminal;

determining a correspondence between the at least one TCI state on the one or more resources and a code division multiplexing (CDM) group to which the DMRS port belongs; and receiving information according to the correspondence between the TCI state on the one or more resources and the CDM group to which the DMRS port belongs;

wherein the determining the correspondence between the at least one TCI state on the one or more resources and the CDM group to which the DMRS port belongs comprises:

determining that two TCI states on the one or more resources correspond to N CDM groups, where N is equal to 1;

wherein in a case that it is determined that two TCI states on the one or more resources correspond to one CDM group, the determining the correspondence between the two TCI states and the CDM group to which the DMRS port belongs comprises:

on each resource of the one or more resources, the CDM group corresponding to one TCI state of the two TCI states;

wherein on each resource of the one or more resources, the CDM group corresponding to one TCI state of the two TCI states comprises:

in a case that at least two time domain resources are allocated to the terminal, the correspondence between the one CDM group and the TCI states is associated with serial numbers of mini slots or slots, one TCI state of the two TCI states is used for mini slots or slots with one type of serial number, and different TCI states are used for mini slots or slots with different types of serial numbers.

8. The terminal according to claim 7, wherein the CDM group corresponding to one TCI state of the two TCI states comprises:

in a case that at least two resources are allocated to the terminal, then on each resource of the at least two resources, the CDM group corresponds to one TCI state of the two TCI states.

9. The terminal according to claim 7, wherein in a case that it is determined that two TCI states on the one or more resources correspond to 2 or 3 CDM groups, the determining the correspondence between the at least one TCI state and the CDM group to which the DMRS port belongs comprises:

receiving signaling and determining the correspondence between the two TCI states and the 2 or 3 CDM groups according to the signaling.

10. A network device, comprising a processor, a transceiver and a memory, wherein the memory stores a program executable by the processor, and the processor, when executing the program, performs the steps of the method according to claim 4.

11. The network device according to claim 10, wherein the CDM group corresponding to one TCI state of the two TCI states comprises:

in a case that at least two resources are allocated to the terminal, then on each resource of the at least two resources, the CDM group corresponds to one TCI state of the two TCI states.

12. The network device according to claim 10, further comprising:

in a case that two TCI states on the one or more resources correspond to 2 or 3 CDM groups, sending signaling to the terminal, wherein the signaling is used for indicating the correspondence between the two TCI states on the one or more resources and the 2 or 3 CDM groups.

* * * * *